Nov. 30, 1965     R. G. DEVANEY     3,221,227
WOUND CAPACITOR AND METHOD OF MAKING
Filed April 27, 1961     3 Sheets-Sheet 1

RICHARD G. DEVANEY
INVENTOR.

BY R. Frank Smith

Paul P. Holmes
ATTORNEYS

RICHARD G. DEVANEY
INVENTOR.

BY R. Frank Smith

Paul P. Holmes
ATTORNEYS

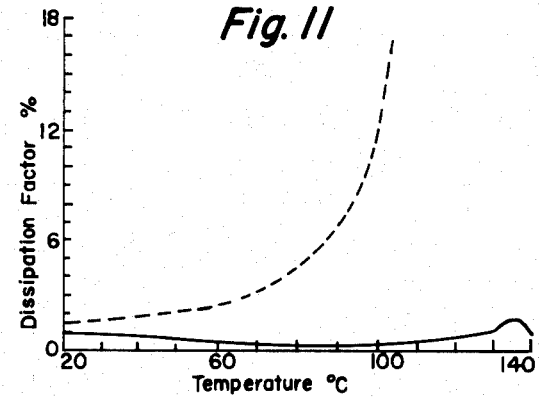
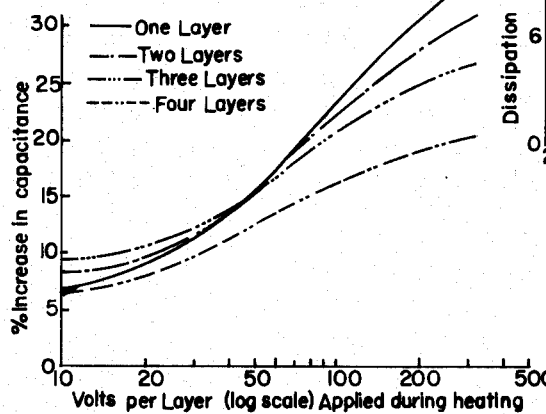
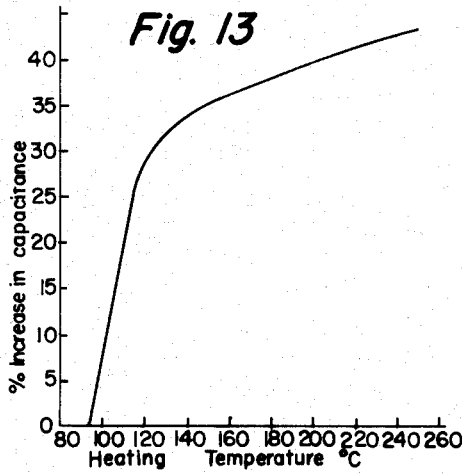
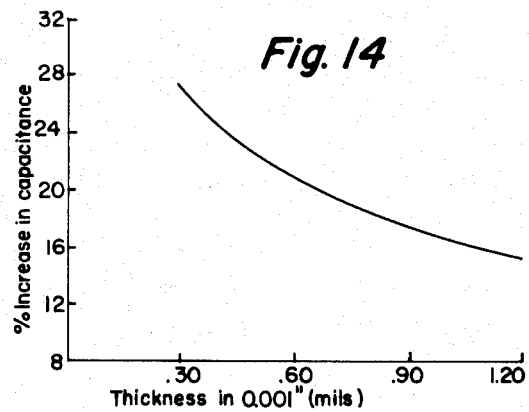

United States Patent Office 3,221,227
Patented Nov. 30, 1965

3,221,227
WOUND CAPACITOR AND METHOD OF MAKING
Richard G. Devaney, Kingsport, Tenn., assignor to Eastman Kodak Company, Rochester, N.Y., a corporation of New Jersey
Filed Apr. 27, 1961, Ser. No. 106,098
19 Claims. (Cl. 317—258)

This invention relates to electrical capacitors and to methods of making such capacitors. More particularly, the present invention relates to the making of wound capacitors formed of non-heat-set planar molecularly oriented linear thermoplastic polyester films interleaved with conductive electrodes wherein the wound capacitors are heat treated causing the plastic dielectric films to shrink and to fuse at the exposed ends of the capacitors to thereby produce a hard unit offering an excellent barrier to the penetration of moisture such that encasement of the capacitors is not required.

It is known to utilize planar molecularly oriented linear thermoplastic polyester films such as, for example, poly-(ethylene terephthalate) for the dielectric spacer, sheets in wound capacitors as is disclosed, for example, in U.S. Patent 2,735,970, granted in the names of D. B. Peck and P. Robinson on February 21, 1956. Poly(ethylene terephthalate) (for example, Mylar) as it is used in the manufacture of capacitors, is biaxially stretched and heat-set to yield a film that is oriented and crystallized. Such films have a high heat distortion temperature and a high and abrupt melting point. According to the Peck patent, the capacitors which are produced by following the invention described therein have sealed ends. However, it is also stated that in order to get a better seal the capacitors may be impregnated with hot silicone oil by submerging the capacitors in a bath of the same maintained at 200° C. for a period of about 30 minutes. Thus, it is recognized even in the Peck patent itself, that heat treatment at temperatures of from 165° C. to 218° C. for periods of 30 minutes or more does not, in fact, provide a homogeneous end seal of the heat-set polyester films when used in extended dielectric-type capacitors therein disclosed such that encasement or encapsulation is not required.

Other methods attempting to overcome this shortcoming have been proposed. Thus, U.S. Patent 2,808,357, granted to W. C. Lamphier on October 1, 1957, discloses the further heat treating of capacitors, made in accordance with Peck patent, under pressure and at temperatures considerably in excess of 218° C. for fusing the exposed surfaces and ends of the polyester films. Because it is difficult to control and maintain the temperature and pressure within the critical range required to obtain the desired electrical characteristics of the polyester films, which characteristics are substantially degraded upon the melting of the films, the method described in the Lamphier patent leaves much to be desired from the standpoint of making acceptable capacitors for commercial sale. In addition, it has been found that capacitors made in accordance with the Peck patent lack physical rigidity and are consequently the source of an undesirable amount of "noise" during use, so that such capacitors frequently fail to meet the rigid specifications required by the Government in the manufacture of numerous ordance devices such as proximity fuses and guided missiles. Furthermore, a characteristic of commercially available poly(ethylene terephthalate) polyester sheeting is poor hydrolytic stability, and capacitors which are made from that polyester in accordance with the Peck patent and/or the Lamphier patent, even if otherwise acceptable, become brittle and tend to disintegrate upon being subjected to a relatively high humidity environment and exhibit excessively high dissipation factors, as will be discussed in more detail herein.

The electrical capacitors comprising and made in accordance with the present invention provide substantial and unexpected improvement in electrical and physical characteristics over the wound polyester film capacitors of the prior art and do, in fact, consistently meet or surpass the exacting requirements of the above-mentioned Government specifications. These improved characteristics are obtained by virtue of a unique combination of factors including use of particular polyester and particular manufacturing techniques as herein described.

The polyester employed is poly(1,4-cyclohexanedimethylene isophthalate-terephthalate) wherein the mole percent of isophthalate is from 0 to 25 and the mole percent of terephthalate is from 100 to 75 based on 100% of the total phthalate constituents. This polyester preferably has an inherent viscosity of at least 0.5 up to about 2.0, and most advantageously at least 0.6 to 1.2, measured in solution in a mixture of phenol and tetrachloroethane. Such a polyester is manufactured by Tennessee Eastman Company, Kingsport, Tennessee, and is at this time commercially available in sheet or film form as "Terafilm" sold by Acme Backing Corporation. The polyester film is stretched during manufacture in two directions at a temperature below the relaxation temperature of the polyester and thus has the desired planar molecular orientation for use as a capacitor dielectric. As hereinafter used in the specification and claims, the term "planar orientation" is intented to define the orientation of the molecules in two directions. Unlike some other commercially available polyester films, the film used in the practice of this invention is not heat-set after being biaxially stretched, i.e. lengthwise and widthwise. Thus, whenever this non-heat-set film is subjected to a heat treatment at a sufficiently high temperature and for a sufficient period of time, the film shrinks and is heat-set without disturbing the planar orientation thereof. Upon being heat-set, such film is not thereafter subject to further shrinkage or molecular disorientation unless heated to a temperature in excess of the heat setting temperature. The method of making the capacitors formed of interleaved poly(1,4-cyclohexanedimethylene isophthalate-terephthalate) film and conductive electrodes comprises heating the units in a heating chamber by induction heating methods or otherwise. Still another aspect of the present invention is the maintaining of a predetermined voltage across the capacitor electrodes during the heat treatment thereof for further increasing the capacitance of the resulting capacitor.

A primary object of the present invention is, therefore, to provide an improved electrical capacitor formed of non-heat-set planar molecularly oriented linear thermoplastic polyester films interleaved with suitable conductive electrodes.

Another object of the present invention is to provide a wound capacitor which comprises a hard and rugged unit requiring neither impregnation nor encasement and having a seal of outstanding and hitherto unobtainable resistance to the penetration of moisture.

Still another object of the present invention is to provide a method of making wound capacitors formed of non-heat-set planar molecularly oriented linear thermoplastic polyester films and interleaved metal foils which is readily and economically manufactured on a commercial scale.

Yet another object of the present invention is to provide an electrical capacitor formed of poly(1,4-cyclohexanedimethylene isophthalate-terephthalate) film and having a high hydrolytic stability and exhibiting relatively low dissipation factors over an extended temperature range.

Still another object of the present invention is to provide a method of heat treating capacitors formed of non-heat-set planar molecularly oriented linear thermoplastic polyester films and interleaved metal foils at a temperature and for a time sufficient to shrink the films and seal the capacitor so that encapsulation is not required.

Another object of the present invention is to provide a method of making electrical capacitors formed of polyester films and interleaved metal foils in which the films are shrunk and the capacitor units sealed by induction heating.

Still another object of the present invention is to provide a method of forming wound electrical capacitors of non-heat-set planar molecularly oriented linear poly(1,4-cyclohexanedimethylene isophthalate terephthalate) films and interleaved metal foils in which the wound units are inductively heated to shrink the films and to form homogeneous end seals thereon.

Another object of the present invention is to provide a method of increasing the apparent dielectric constant of a non-heat-set planar molecularly oriented linear thermoplastic polyester film which is interleaved with metal foil to form an electrical capacitor.

Yet another object of the present invention is to provide a method of making wound electrical capacitors formed of non-heat-set planar molecularly oriented linear poly(1,4-cyclohexanedimethylene isophthalate-terephthalate) films and interleaved metal foils by which the capacitance of the wound units is increased through the application of a unidirectional voltage across the metal foil electrode during heating of the units to shrink the films and to form a homogeneous end seal on the capacitors.

Still other objects and advantages of the present invention will become readily apparent to those skilled in the art from the following description with reference to the drawings in which like characters denote like parts and wherein.

Figure 4:
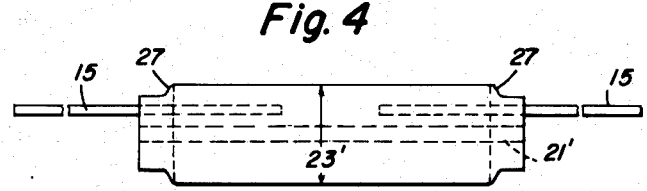
Figure 5:
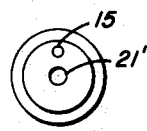

FIGS. 4 and 5, a side elevation view and an end view, respectively, show the configuration and shape of the capacitor after heat treatment according to the invention; and FIGS. 6 through 14 are graphs which illustrate some of the characteristics of the poly(1,4 - cyclohexanedimethylene isophthalate-terephthalate) film capacitors of this invention as compared to capacitors formed using poly(ethylene terephthalate) films, but otherwise similar thereto.

Figure 1:
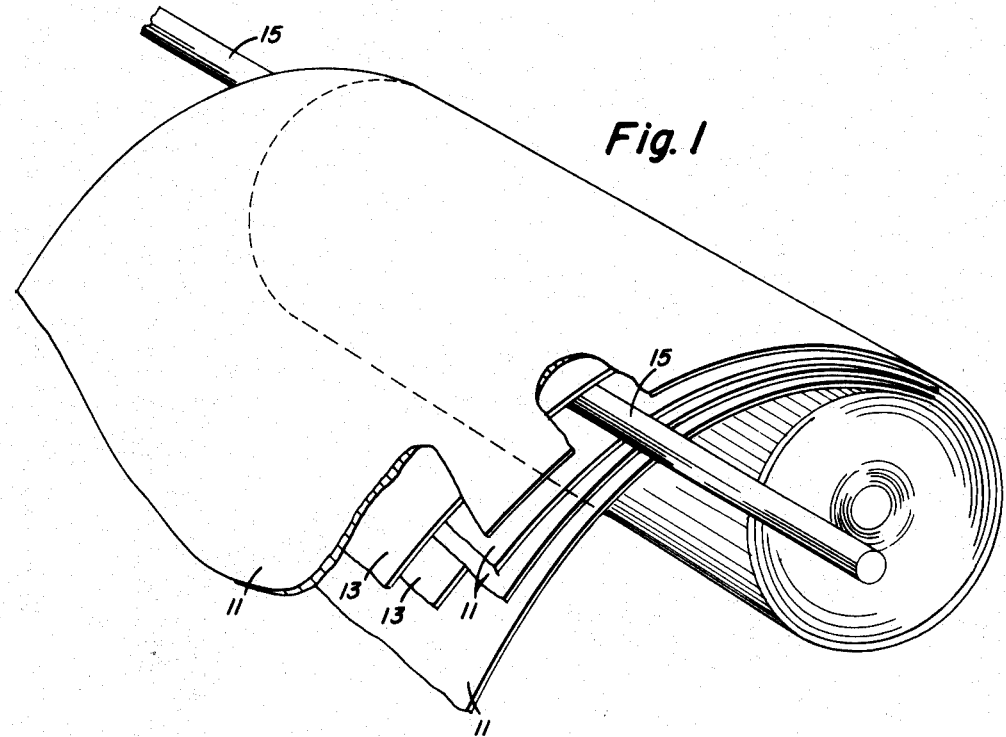
FIG. 1 is an enlarged perspective view of electrical capacitors of the present invention and illustrates the relative positions of the interleaved dielectric films and metal foil electrodes, and of the lead terminals.

Referring to FIG. 1, the wound capacitor of the present invention comprises non-heat-set planar molecularly oriented linear poly(1,4-cyclohexanedimethylene isophthalate-terephthalate) films 11, two aluminum foil electrodes 13, and two wire lead terminals 15 which are inserted in electrical contact with different ones of the metal foils 13, said terminals being inserted during winding of the unit and being positioned to extend from the opposed ends thereof. Terminals 15 are held in the capacitor by the overlying convolutions of foils and films.

Figure 2:
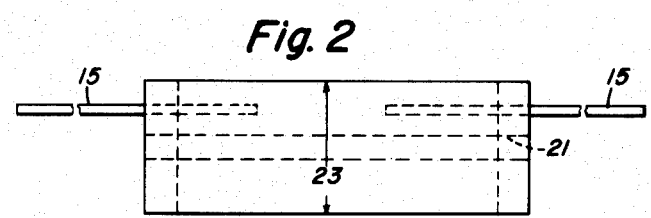
FIG. 2 is a side elevation view and FIG. 3 is an end view of the capacitor showing the configuration of the wound unit prior to the heat treatment thereof.
Figure 3:
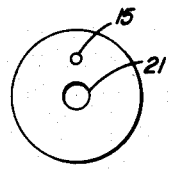

After the terminals 15 have been inserted, the winding of the interleaved films 11 and foils 13 is continued until the desired capacitance is obtained or nearly obtained. The metal foils 13 are then cut off and a few extra turns of the films 11 are wound around the unit to provide an exterior cover for the capacitor as hereinafter set forth. Prior to starting to wind the foils 13 interleaved with films 11 it is also desirable to make first a few turns of the film 11, which form an interior cover for the capacitor. It will be noted that the films 11 are sufficiently wide to overlap the adjacent metal foils 13 by a substantial amount. FIGS. 2 and 3 illustrate the shape of the wound capacitor after it has been removed from the winding arbor. The relative overlap of films 11 with respect to foils 13 is indicated in FIG. 2 by the dotted lines. The capacitor at this point in its manufacture is a loosely wound unit having a relatively large center opening 21 and a relatively large over-all diameter as indicated at 23.

In order to obtain the optimum physical and electrical characteristics in accordance with the capabilities of the present invention, the films 11 are shrunk by heating the wound units, for example, in a suitable heating chamber or oven, not shown. The exact temperature and time required to obtain optimum electrical characteristics depends upon the physical and electrical dimensions of the capacitor. As a rule, it is necessary to exceed the second order transition temperature of the polyester film and preferably to exceed the heat distortion temperature thereof. On the other hand, the melting point must not be attained. I prefer to utilize a temperature which is above the heat distortion temperature, but below the no-strength temperature of the film. As used herein, the second order transition temperature is that temperature at which there is an abrupt discontinuity in the thermal expansion of the material; the heat distortion temperature is that temperature reached at a linear rate as a function of time, at which an arbitrary chosen elongation is reached for a particular load and is a function of load; and the no-strength or zero-strength temperature is that temperature near the melting point virtually independent of load where there is a constant and irreversible elongation and loss of physical properties. The heating time is adjusted to obtain optimum results, but is usually greater than 30 seconds and less than 10 minutes. When the wound units are heated in an oven or heating chamber, a temperature range of from 140° C. to 235° C. for periods of from 15 to 3 minutes has been found satisfactory.

By way of example, capacitors which measured .060 microfarad before heat treatment and formed of alternate layers of non-heat-set poly(1,4-cyclohexanedimethylene isophthalate-terephthalate) film 1³⁄₁₆" wide by .00025" thick and aluminum foil electrodes each 1" wide and .00023" thick, were wound 35 turns around a .10" mandrel, wire leads were inserted during the 18th turn and the wound units were heated for six minutes in an oven maintained at a temperature of 200° C. For comparison purposes physically identical capacitors were made using heat-set planar molecularly oriented linear poly(ethylene terephthalate) films of the same thickness and width as the non-heat-set film above and these units were heated in the oven simultaneously with and for the same length of time as those made in accordance with the present invention. The heat treatment caused the non-heat-set films 11 to shrink, resulting in a substantial reduction in the diameter of the center aperture 21 and in a slight reduction in the over-all diameter 23 of the capacitor as indicated at 21' and 23', respectively, in FIGS. 4 and 5. In some units, the shrinkage was sufficient to completely eliminate the center aperture 21. The shrinkage of the films 11 also caused the terminals 15 to be tightly retained within the capacitor and the overlapping edges of the films 11 on the ends of the capacitors formed a reduced diameter end having a homogeneous end seal as indicated at 27 (slightly exaggerated for clarity of illustration) in FIG. 4. The extra turns of film 11 on the inside and on the outside of the capacitor were also sealed. The term "homogeneous end seal" or "seal" as used in this specification and claims is intended to define the bonded condition which occurs between adjacent surfaces of films 11. It should be understood that the temperature of the heat treatment is not sufficient to melt the films 11 and indeed such melting is not desirable as this would cause relaxation of the orientation of the molecules of the films and thus a degradation of the electrical characteristics of the films. The adjacent overlapping surfaces of the films 11 are sealed, however, and thus solid and impervious capacitors are obtained. It is impossible to unwind the wound units after this heat treatment because of the tenacious inter-layer bonding of film to film and film to foil.

The poly(ethylene terephthalate) film capacitors after being so heated and allowed to cool showed little or no change in physical appearance. The adjacent surfaces of the films were not sealed. No seal was formed at the opposed ends of the capacitors. The wound units were easily unwound. The lead pull-out strength was very low compared to that of the capacitors of the present invention.

Figure 6:
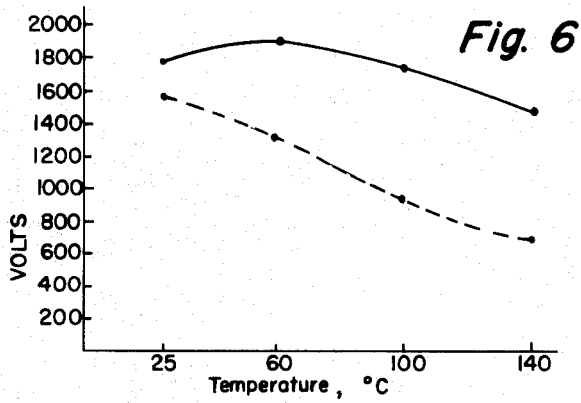

The dielectric strength of the films in the two groups of capacitors was determined by applying voltages in steps of 400 volts D.C. per mil of film thickness (in other words steps of 100 volts D.C. on these capacitors) on the capacitor electrodes at various temperatures. The results are shown in FIG. 6 wherein the solid line curve is a plot of voltages which were measured for the .00025" thick poly(1,4-cyclohexanedimethylene isophthalate-terephthalate) film capacitors and the dashed line curve corresponding to the voltages measured for the .00025" thick poly(ethylene terephthalate) film capacitors. The actual dielectric strength in volts per mil is obtained by multiplying the voltages indicated by 4 because .00025" thick films were used. The marked superiority of the capacitors of the present invention is apparent.

Figure 7:
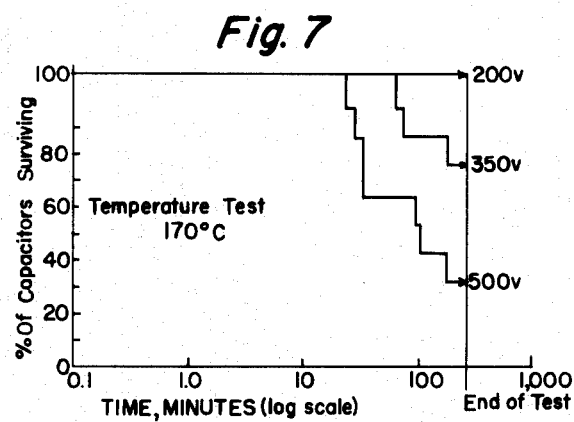
Figure 8:
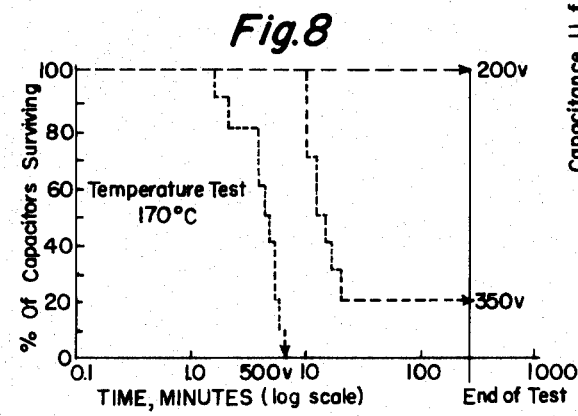
Figure 9:
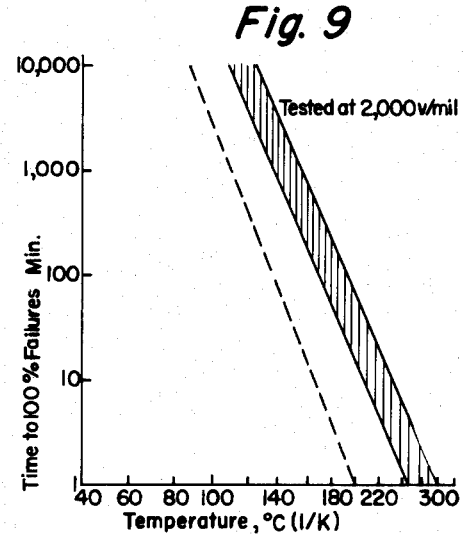

Capacitors from each group were subjected to an accelerated aging test. In this test, the capacitors were subjected to high temperatures and voltages and the time distribution of failures was noted. The temperatures employed were 140, 155, 170 and 185° C. The voltage stresses were 800, 1400 and 2000 volts per mil which, since .25 mil film was used in the capacitors, amounted to 200, 350 and 500 volts, respectively. FIGS. 7 and 8 are illustrative of the datum recorded. FIG. 7 is a plot of the percent of capacitors of the present invention which survived the 170° C. temperature test versus time in minutes on a log scale. FIG. 8 is a similar plot of the datum obtained from the poly(ethylene terephthalate) film capacitors. The results of these accelerated aging tests are summarized in FIG. 9 which represents the data obtained during the test at 2000 volts/mil. In FIG. 9 the datum for the capacitors of this invention is shown by the solid lines whereas that of the poly(ethylene terephthalate) film capacitors is shown by the dashed line. Again, the superiority of the capacitors of the present invention, which lasted 3 to 10 times as long as the others, is apparent. It should be noted that insulation aging is an inverse function of the absolute temperature and generally can be considered a chemical rate phenomenon. When the thermal life of a dielectric fits this concept, the data will form a straight line when plotted as log $t$ versus $1/T$ where $t$ is time and T is absolute temperature in degrees Kelvin. This procedure has been followed in making the graph which is represented in FIG. 9.

Figure 10:
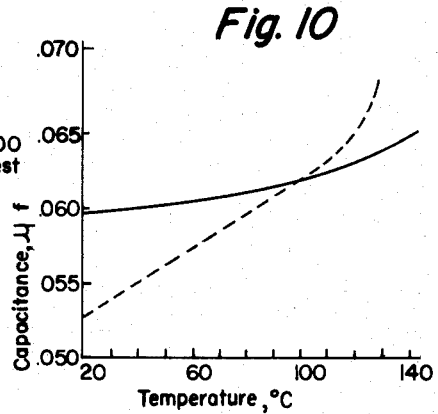

Next, the hydrolytic stability of the capacitors was tested. In this test, the capacitors were sealed in glass containers containing water and were suspended in the air space above the water, the temperature of the water was raised to 110° C. and the capacitors were maintained in this condition of high heat and 100% relative humidity for eight days. Then the capacitors were removed and dried and both the capacitance and dissipation factor at 100 cycles/second at various temperatures, were determined. The results of these determinations are shown in FIG. 10 and FIG. 11 wherein the values obtained for the capacitors of the present invention are shown by the solid line curves and the values obtained for the capacitors formed of poly(ethylene terephthalate) film are shown by the dashed line curves. The vast improvement accomplished by the present invention is again apparent, as the capacitors of the present invention appeared unchanged electrically and physically, while the poly(ethylene terephthalate) film capacitors were brittle, crystalline and could be crumbled in the hand. In addition, as indicated in FIGS. 10 and 11, the capacitance of the poly(ethylene terephthalate) film capacitors was no longer constant (for practical purposes) with temperature, and the dissipation factor was excessively high, i.e., 10.0% to 95° C., at 100 c.p.s.

As a further test, capacitors of the present invention and capacitors of the poly(ethylene terephthalate) film, all of identical physical size and configuration were boiled in water for 16 hours. The capacitors of the present invention underwent no apparent change even after 16 hours but the others turned white and became crystalline and brittle after just one hour.

As an alternative to the method of making electrical capacitors already described and as another aspect of the present invention, I have discovered a method of very rapidly shrinking the films 11 and obtaining the homogenous end seal. More particularly, the method comprises inductively heating the wound units made of poly(1,4-cyclohexanedimethylene isophthalate-terephthalate) films as previously described, instead of heating them in an oven or heating chamber. The individual units may be placed within a tube made of Teflon (a brand of polytetrafluoroethylene) or other similar dielectric material to confine the units during the heating so that the exterior shape of the capacitor upon cooling and removal is substantially the same as the interior of the tube, or the units may be merely inductively heated without being restrained by such a tube. The placing of the individual capacitors in Teflon tubes has the advantage of assuring that the exterior shapes of the capacitors will be uniform and substantially cylindrical but is not otherwise necessary. The time required for the heat treatment of capacitors using induction heating apparatus is considerably less than the time required when such capacitors are heat treated in the oven or heating chamber as described above. Of course, the exact length of time required will depend upon the characteristics of the induction heating apparatus as well as the physical and electrical size of the individual capacitors themselves. As was the case in the oven heating, it is necessary to exceed the second order transition temperature of the films 11 and it is preferred to exceed the heat distortion temperature but to keep below the no-strength temperature. To illustrate by way of example 35-turn capacitors, having a capacitance before heating of .036 microfarad, formed from four films of .00030" thick and 1 5/16" wide and two aluminum foils .00025" thick and 1" wide were inserted coaxially in a 3-turn ½" inside diameter work coil of a 1.0 kilowatt, 465 kilocycle induction generator which was adjusted to operate at very low power level for a period of 15 seconds. Under these conditions the films shrunk, squeezing out entrained air and homogenous end seals were formed. Similar capacitors were positioned perpendicularly to the magnetic field in a two-turn work coil and similar heating times and results were obtained. Similar capacitors were processed in exactly the same way as above except that they were first positioned in and constrained by a Teflon tube. Again, similar heating times and results obtained but these capacitors had the further advantage of uniformity in external appearance which, of course, conformed to that of the inside of the Teflon tube. It was impossible to unwind the capacitors formed and heated by any of these several methods after they had cooled. When capacitors having 80 turns having a capacitance of .150 microfarad before heating but otherwise similar to the 35-turn capacitors just described were inductively heated as above similar respective heating times and results obtained.

In contrast to the foregoing, when similar 80-turn capacitors having a capacitance of .140 microfarad before heating and formed of heat-set planar molecularly oriented linear poly(ethylene terephthalate) film of the same physical size as the film in the other 80-turn capacitors, were heated coaxially in the above described 3-turn work coil of a 1 kilowatt, 465 kilocycle induction generator which was adjusted to operate at its maximum power level, or were heated while oriented perpendicular to the magnetic field in a 2-turn work coil, about two minutes were required to heat the film above its heat distortion temperature. The film shrank, squeezing out entrained air, but the film which extended beyond the foil electrodes was affected only slightly and no seal on the ends of the capacitors was formed. Upon cooling, the capacitors were hard through the area where the foil electrodes were present but these capacitors were easily unwound.

The electrical and physical properties of the capacitors made in accordance with this aspect of the present invention, that is, which have been inductively heated, are for all practical purposes, physically and electrically identical to those which result from the heat treatment of the units in an oven or heating chamber as first described above. Thus, the data represented in FIGS. 6 through 11 also applies to capacitors made according to this aspect of the present invention.

I have discovered that it is useful during formation of electrical capacitors made in accordance with the present invention, to increase the apparent dielectric constant of the films 11 and thus further increase the capacitance of the wound units over that which is obtained by following the methods previously described. The apparent dielectric constant of the films is increased by applying a unidirectional voltage across the foil electrodes of the capacitors during the film shrinking heat treatment. The capacitance of the unit of up to 35 percent more than that which would be obtained by heating without applying a voltage stress is unexpectedly thus obtained. The scientific explanation of this highly valuable phenomenon is not presently known, but it is believed that it may result from some sort of molecular rearrangement in the films. The particular unidirectional voltage which will give the maximum increase in capacitance is similar in magnitude to the rated or life voltages of the particular capacitor being made. When an A.C. voltage was applied across the electrode foils of the capacitors during the heating, little or no increase in capacitance over that obtained by heating without stress was noted.

The following examples illustrate this aspect of the present invention. A number of groups of 35-turn capacitors were formed respectively of 1, 2, 3, and 4 thicknesses of non-heat-set planar molecularly oriented linear poly(1,4-cyclohexanedimethylene isophthalate-terephthalate) film, each thickness being .00030" thick and 1 3/16" wide, interleaved with two aluminum foil electrodes each .00025" thick and 1" wide. The capacitance of the wound units was measured and a representative group of the units were then heated for 10 minutes at 230° C. in an oven while applying constant D.C. voltages across the electrodes throughout the 10 minute period. The capacitors were then cooled and the capacitance again measured. FIG. 12 is a plot of the percent increase in capacitance versus, on a log scale, the volts per film thickness which were applied. A further quantity of similar single layer 35-turn units, having a capacitance on the average of .058 microfarad, were wound. Some of these were heated at various different temperatures for 15 minutes while applying 270 volts D.C. across the electrode foils. After cooling, the increase in capacitance was measured and FIG. 13 is a plot of the results obtained. Still other groups of capacitors were made formed respectively of 1, 2, 3 and 4 thicknesses of the non-heat-set planar molecularly oriented linear poly(1,4-cyclohexanedimethylene isophthalate-terephthalate) films and interleaved foils (having the same dimensions noted above) but this group had varying numbers of turns so that all of the capacitors measured about .058 microfarad before heating. A voltage stress of 333 volts D.C. per mil film thickness was applied across the electrodes and the units were heated at 230° C. for 15 minutes. After cooling, the capacitance was again measured and the percent increase in capacitance versus film thickness was plotted. This plot is shown in FIG. 14. As is apparent from the graphic showings of FIGS. 12, 13, and 14, the greatest increase in capacitance is obtained using relatively thin films, a relatively high temperature and a relatively high voltage stress. However, a decided increase was noted even when the films were relatively thick.

To further illustrate the invention by way of example, 35-turn helically wound capacitors formed of interleaved single layers of poly(1,4-cyclohexanedimethylene isophthalate-terephthalate) film, .00030" thick and 1 3/16" wide, and aluminum foil .00025" thick and 1" wide, having a capacitance of about .060 microfarad before heat treating, were heated in an oven at 150° C. for 15 minutes. One group of the capacitors had 200 volts D.C. applied across its terminals during this heating period and the other group was not under any voltage stress. Following cooling, the capacitance of the capacitors was measured and compared. It was found that the group which had been heat treated under voltage stress had a capacitance of about .077 microfarad and the other group measured .062 microfarad. Thus, the capacitors which had been heated under voltage stress had increased in capacitance 28% whereas the capacitance of the other group increased only about 3.3%. This demonstrates another aspect having great commercial value.

Capacitors which were physically similar to this last described group except for being formed of heat-set commercially available .00025" thick poly(ethylene terephthalate) film, were heated at 230° C. for periods of 15 minutes under voltage stresses varying from 25 to 270 volts D.C. and then cooled. Some small upwards shifts in the capacitance were noted; however, the behavior was very erratic and completely unpredictable. In addition a number of the units failed by internal shorting prior to the shrinking of the films whenever voltages of 200 volts D.C. or more were applied. This does not occur in capacitors made according to the present invention out of non-heat-set poly(1,4-cyclohexanedimethylene isophthalate-terephthalate) film.

It will now be appreciated by those skilled in the art that we have disclosed an electrical capacitor and method of making, which capacitor and method represent a striking improvement over the known capacitors and methods. The methods disclosed herein render the making of polyester film type electrical capacitors commercially feasible and provide a capacitor with characteristics not previously obtainable. Only an extended dielectric-type capacitor has been illustrated and described. However, it will be appreciated by those skilled in the art that stacked capacitors, extended-foil-type capacitors, single paper or multipaper capacitors, capacitors having electrodes formed of metalized dielectric films, capacitors having foil or other type lead terminals and still other variations could be made utilizing the novel concepts disclosed herein. The invention has been described in detail with particular reference to preferred embodiments thereof, but it will be understood that variations and modifications can be effected within the spirit and scope of the invention as described hereinabove and as defined in the appended claims.

Having now particularly described my invention, what I desire to secure by Letters Patent of the United States and what we claim is:

1. An electric capacitor formed of interleaved conductive electrodes and non-heat-set planar molecularly oriented linear poly(1,4-cyclohexanedimethylene isophthalate-terephthalate) films wherein said films have been heat shrunk after being interleaved with said electrodes.

2. An electric capacitor formed of interleaved conductive electrodes and non-heat-set planar molecularly oriented linear poly(1,4-cyclohexanedimethylene isophthalate-terephthalate) films wherein said films have been shrunk after being interleaved with said electrodes.

3. An electric capacitor in accordance with claim 2 and wherein said films overlap said electrodes and are enrolled therewith to form a wound capacitor.

4. An electric capacitor in accordance with claim 1 and wherein said films overlap said electrodes and are enrolled therewith to form a wound capacitor.

5. An electric capacitor in accordance with claim 1 and wherein a unidirectional voltage is impressed across the electrodes during the heat setting of said films.

6. An electric capacitor in accordance with claim 5 and wherein said films are coextensive and overlap the same, and said electrodes comprise metal foils which are enrolled with the films to form a wound capacitor.

7. An electric capacitor formed of wound metal foil electrodes and non-heat-set planar molecularly oriented linear poly(1,4-cyclohexanedimethylene isophthalate-terephthalate) films interleaved therewith to form a wound unit having excellent hydrolytic stability and dissipation factors, a first lead terminal extending into said wound unit in electrical contact with one of said electrodes, a second lead terminal extending into said wound unit in electrical contact with another of said electrodes and spaced by at least one of said films from said one electrode, said films being coextensive with said electrodes and substantially overlapping the same, said wound unit having been heated at a temperature which is at least as great as the heat distortion temperature of the films and is less than the no-strength temperature thereof for a period of time sufficient to bring about (A) substantial shrinkage of said films without disturbing the planar orientation thereof to thus form a hard capacitor having superior electrical characteristics and (B) sealing of the exposed portions of said films to thus provide a capacitor which presents an excellent barrier to the penetration of moisture.

8. An electric capacitor in accordance with claim 7 and wherein a substantially constant unidirectional voltage approximately equal to the rated voltage of the capacitor was impressed across said electrodes during the heating thereof to thus provide a capacitor having an unexpectedly high capacitance per unit volume.

9. The method of making an electric capacitor which comprises interleaving conductive electrodes and non-heat-set planar molecularly oriented linear poly(1,4-cyclohexanedimethylene isophthalate-terephthalate) films to form a capacitor unit, heating the unit at a temperature which is at least as great as the heat distortion temperature of the films and is less than the no strength temperature thereof, for a period of time sufficient to bring about shrinkage of the films without disturbing the planar orientation thereof, and applying a unidirectional voltage across the electrodes during said heating.

10. The method of making an electric capacitor which comprises interleaving conductive electrodes and non-heat-set planar molecularly oriented linear poly(1,4-cyclohexanedimethylene isophthalate-terephthalate) films to form a capacitor unit wherein the films are larger in area than the electrodes and therefore overlap the same, and heating the unit at a temperature which is at least as great as the heat distortion temperature of the films and is less than the no-strength temperature thereof, for a period of time sufficient to bring about sealing of the overlapping portions of said films, and applying a substantially constant unidirectional voltage across said electrodes throughout the period of said heating.

11. The method of making an electric capacitor in accordance with claim 9 and wherein said heating is accomplished by induction.

12. The method of making an electric capacitor in accordance with claim 9 and wherein the unidirectional voltage is substantially constant and is applied across said electrodes throughout the period of said heating.

13. The method of making an electric capacitor in accordance with claim 12 and wherein said unidirectional voltage approximates the rated voltage of the resultant capacitor.

14. The method of making an electric capacitor in accordance with claim 10 and wherein said heating is accomplished by induction.

15. The method of making an electric capacitor which is formed of metal foil electrodes and non-heat-set planar molecularly oriented linear poly(1,4-cyclohexane dimethylene isophthalate-terephthalate) films having a width that is greater than that of the foil electrodes, which method comprises winding said films interleaved with said foil electrodes in overlapping relation thereto to form a wound unit, and heating said wound unit at a temperature which is at least as great as the heat distortion temperature of the films and is less than the no-strength temperature thereof, for a period of time sufficient to bring about (A) substantial shrinkage of said films without disturbing the planar orientation thereof, and (B) sealing of the exposed portions of said films.

16. The method of making an electric capacitor in accordance with claim 15 and wherein said heating is accomplished by induction.

17. The method of making an electric capacitor in accordance with claim 15 and wherein a unidirectional voltage is impressed across said foil electrodes during said heating.

18. The method of making an electric capacitor in accordance with claim 15 and wherein a substantially constant unidirectional voltage is applied across said electrodes throughout the period of said heating.

19. The method of making an electric capacitor in accordance with claim 18 and wherein said unidirectional voltage approximates the rated voltage of the resultant capacitor.

References Cited by the Examiner
UNITED STATES PATENTS

| | | | |
|---|---|---|---|
| 1,997,263 | 4/1935 | Meissner | 317—258 |
| 2,735,970 | 2/1956 | Peck et al. | |
| 2,901,466 | 8/1959 | Kibler et al. | 260—47 |
| 2,908,067 | 10/1959 | Clemons | 29—25.42 |
| 2,915,808 | 12/1959 | Clemons | 29—25.42 |
| 2,957,114 | 10/1960 | Lamphier | 317—258 |
| 3,001,267 | 9/1961 | Heibel et al. | 317—242 XR |
| 3,040,415 | 6/1962 | Rayburn | 29—25.42 |

EARL M. BERGERT, *Primary Examiner.*

JOHN T. BURNS, *Examiner.*